US008906152B2

(12) United States Patent
Martin (10) Patent No.: US 8,906,152 B2
(45) Date of Patent: Dec. 9, 2014

(54) RECLAIMED ASPHALT PAVEMENT CONTAINING POLYPHOSPHORIC ACID MODIFIED BINDER

(75) Inventor: Jean-Valery Martin, Princeton, NJ (US)

(73) Assignee: Innophos, Inc., Cranbury, NJ (US)

( * ) Notice: Subject to any disclaimer, the term of this patent is extended or adjusted under 35 U.S.C. 154(b) by 445 days.

(21) Appl. No.: 12/818,841

(22) Filed: Jun. 18, 2010

(65) Prior Publication Data
US 2011/0015313 A1    Jan. 20, 2011

Related U.S. Application Data

(60) Provisional application No. 61/218,761, filed on Jun. 19, 2009.

(51) Int. Cl.
| C08L 95/00 | (2006.01) |
| E01C 7/18 | (2006.01) |
| E01C 7/26 | (2006.01) |
| E01C 19/10 | (2006.01) |
| C08K 5/52 | (2006.01) |

(52) U.S. Cl.
CPC . *C08L 95/00* (2013.01); *E01C 7/18* (2013.01); *E01C 7/265* (2013.01); *E01C 19/1068* (2013.01); *E01C 19/1004* (2013.01); *C08K 5/52* (2013.01)
USPC .......... 106/284.1; 106/281.1; 524/59

(58) Field of Classification Search
USPC .............. 106/284.1, 281.1; 524/59
See application file for complete search history.

(56) References Cited

U.S. PATENT DOCUMENTS

| 7,417,082 B2 * | 8/2008 | Martin ............... 106/284.1 |
| 7,446,139 B2 * | 11/2008 | Martin ............... 524/68 |
| 7,902,277 B2 * | 3/2011 | Reinke et al. ............... 524/71 |
| 7,951,857 B2 * | 5/2011 | Crews et al. ............... 524/60 |
| 7,985,787 B2 * | 7/2011 | Martin ............... 524/59 |
| 8,138,242 B2 * | 3/2012 | Reinke et al. ............... 524/69 |
| 8,211,960 B2 * | 7/2012 | Martin ............... 524/68 |
| 2006/0243163 A1 | 11/2006 | Martin |
| 2007/0082983 A1 | 4/2007 | Crews et al. |
| 2007/0287778 A1 | 12/2007 | Martin |
| 2009/0054562 A1 * | 2/2009 | Martin ............... 524/59 |
| 2009/0249978 A1 * | 10/2009 | Martin et al. ............... 106/284.1 |

OTHER PUBLICATIONS

International Search Report, Aug. 18, 2010.

* cited by examiner

*Primary Examiner* — Helene Klemanski
(74) *Attorney, Agent, or Firm* — Joanne P. Will (57) ABSTRACT

Pavement compositions containing increased amounts of reclaimed asphalt pavement (RAP) are described. Addition of polyphosphoric acid (PPA) to pavement compositions containing RAP allows increased RAP content in road pavements while maintaining acceptable properties in the final pavement composition. Methods for producing road pavements containing RAP and PPA are also provided.

10 Claims, 7 Drawing Sheets

| SPECIFIED TYPE | RAP CONTENT | AVERAGE AIR VOIDS (%) | INDIRECT TENSILE STRENGTH | | AVERAGE TSR (%) |
|---|---|---|---|---|---|
| | | | DRY | CONDITIONED | |
| SBS MODIFIED | VIRGIN | 6.8% | 209.4 | 193.5 | 92.4% |
| SBS MODIFIED RAP | 15% RAP | 6.5% | 290.1 | 241.0 | 83.0% |
| | 30% RAP | 6.6% | 280.2 | 281.0 | 100.3% |
| | 45% RAP | 6.5% | 278.2 | 261.3 | 93.9% |
| SBS-PPA MODIFIED | VIRGIN | 6.5% | 200.5 | 191.6 | 95.5% |
| SBS-PPA MODIFIED RAP | 15% RAP | 6.6% | 253.3 | 258.5 | 102.1% |
| | 30% RAP | 6.6% | 289.8 | 262.7 | 90.6% |
| | 45% RAP | 6.6% | 270.9 | 237.3 | 87.6% |
| PPA MODIFIED | VIRGIN | 6.6% | 162.9 | 164.7 | 101.1% |
| PPA MODIFIED RAP | 15% RAP | 6.5% | 260.0 | 187.9 | 72.3% |
| | 30% RAP | 6.6% | 279.6 | 255.4 | 91.3% |
| | 45% RAP | 6.7% | 330.4 | 347.8 | 105.3% |

RECLAIMED ASPHALT PAVEMENT CONTAINING POLYPHOSPHORIC ACID MODIFIED BINDER

This application claims priority under 35 U.S.C. §119(e) to U.S. Provisional Application Ser. No. 61/218,761 filed on Jun. 19, 2009.

BACKGROUND

The availability of materials used in road pavements, in particular asphalt and aggregate material, has in recent years been reduced. In addition, the materials that are available are becoming more expensive. As a result, there has been an increase in the use of reclaimed asphalt pavement (RAP) in road pavements. RAP is removed and/or reprocessed pavement materials containing asphalt and aggregates. RAP is generated when asphalt pavements are removed, for example during reconstruction or resurfacing of a roadway or to access buried utilities. The removed pavement material is crushed and screened. The resulting RAP product consists of aggregates coated with asphalt cement.

Asphalt pavement is generally removed by milling or full depth removal. In milling, a milling machine removes about 50 mm (2 in.) of pavement material per pass. Full depth removal involves breaking the pavement using a bulldozer or the like. In either case, the removed material may be hauled to a central processing facility, where it is crushed, screened and prepared for use in new pavements. In some cases, the removed pavement material may be pulverized in place.

The RAP may be incorporated into new pavement using typical hot mix or cold mix processes known to those skilled in the art. RAP that is centrally processed may be incorporated into hot mix or cold mix asphalts as an aggregate substitute. Because the RAP includes asphalt cement on the reprocessed material, less asphalt is required in the new pavement. In-place recycling using hot mix or cold mix processes may also be used with RAP. The use of RAP reduces the quantity of new asphalt and aggregate required when paving a road. Details regarding the use of RAP can be found, for example, in Research Results Digest, Number 253, March 2001, "Recommended Use of Reclaimed Asphalt Pavement in the Superpave Mix Design Method: Guidelines", the contents of which are incorporated herein by reference.

The quantity of RAP that may be included in road pavement material is limited in many countries and in many states in the United States. Typically, regulations limit the amount of RAP that may be included in new pavement to no more than about 25% by weight on average. This limitation has been imposed based upon the stiffening effect of RAP on the final asphalt mix material. The stiffening effect of the RAP is related to some extent to fatigue failures of the asphalt mix which reduces the useful life of the pavement. The stiffening effect of the RAP is the result of aging of the asphalt binder coating the aggregate contained in the RAP. Asphalt aging typically leads to an increase in the stiffness and viscosity of the asphalt binder to the extent that blending of the aged binder with fresh asphalt binder can be non-homogeneous. It would be desirable to increase the amount of RAP that can be used in new pavement materials to reduce the cost and increase the available quantity of materials for pavements.

RAP may also be used in other products that utilize asphalt binders. For example, RAP may be used in asphalt roofing materials or roofing applications, such as in asphalt roofing shingles.

DESCRIPTION OF THE INVENTION

The present invention is directed, in one aspect, to reclaimed asphalt pavement (RAP) containing polyphosphoric acid (PPA) and the use of RAP in mixtures of new pavements containing PPA modified asphalt. In another aspect, the invention is directed to adding PPA to RAP or to new pavement materials incorporating RAP to improve the properties of the new pavement material containing RAP. In yet another aspect, the invention is directed to the use of RAP in products utilizing asphalt binders, in particular in roofing materials or roofing applications such as asphalt shingles.

Polyphosphoric acid (PPA) is typically made by the polymerization of phosphoric acid via a thermocondensation process. PPA can have a concentration as high as 118% by weight expressed as $H_3PO_4$ content. In the compositions of the present invention, any concentration of PPA may be used. Preferably, the PPA concentration is between 105% and 115% expressed as $H_3PO_4$ content.

One reason that PPA is added to asphalt compositions used in road paving is to increase the performance of the asphalt binder and ultimately the asphalt mix. It has been observed that the addition of PPA to an asphalt binder can reduce the susceptibility of the binder to aging. For new pavement materials, several methods of adding PPA to the asphalt and the pavement material are known. For example, PPA may be blended with the asphalt prior to mixing with an aggregate. In new asphalt pavements, PPA may be added in any amount that is useful in enhancing desired properties of the asphalt. Typically, PPA is added to achieve a concentration in the asphalt of between about 0.1% by weight and 3% by weight of the weight of the asphalt binder. Preferably, PPA is added to achieve a concentration in the asphalt of between about 0.6% by weight and 2.25% by weight of the weight of the asphalt binder.

In some cases, pavement materials may be produced by combining new pavement materials (i.e. asphalt, aggregate and additives such as PPA, polymers, etc.) with RAP. RAP is obtained when old pavement materials are removed from a roadway in preparing the roadway for repaving. RAP generally comprises aged asphalt, aggregate and other materials, such as asphalt additives. In the past, the amount of RAP that could be combined with new pavement materials has been limited to about 25% by weight of the total weight of the new pavement on average. This limit has been imposed due to concerns that using increased amounts of RAP will affect the performance of the fresh mix pavement.

It has been discovered that RAP that contains PPA modified asphalt, or PPA modified asphalt used in conjunction with RAP that does not contain PPA modified asphalt, can be used in increased quantities without affecting the overall performance of the fresh mix pavement and may improve some qualities of the fresh mix pavement, including the fatigue, moisture resistance and permanent deformation properties.

RAP containing PPA modified asphalt can be combined with fresh pavement in quantities of up to 45% by weight or more without significant adverse effect on the performance of the fresh mix. The RAP may also contain additives in addition to PPA typically used in asphalt mixes, such as for example polymers, crumb rubber, anti-stripping agents, lime, fibers, gilsonite or combinations thereof.

In one embodiment, the fresh mix pavement contains at least 30% by weight RAP comprising PPA modified asphalt. In some embodiments, the fresh mix pavement contains up to 45% by weight RAP comprising PPA modified asphalt. The invention is not limited in this regard, and any amount of RAP containing PPA modified asphalt may be used provided that the final pavement product meets required criteria.

The amount of PPA in the modified asphalt in the RAP, or in the binder that is mixed with RAP that does not contain PPA, is preferably at least 0.1% by weight of the weight of the asphalt. In some embodiments, the quantity of PPA in the RAP is between about 0.1% by weight and 3% by weight of the weight of the asphalt binder. Preferably, PPA is added to achieve a concentration in the asphalt of between about 0.6% by weight and 2.25% by weight of the weight of the asphalt binder.

The asphalt in the RAP may include additives in addition to the PPA. There are numerous asphalt additives that are known to those skilled in the art. For example, the RAP may be modified by addition of other acids, polymers such as rubber or crumb rubber, anti-stripping agents, lime, gilsonite or fibers. In one embodiment, the RAP is comprised of asphalt modified with PPA and styrene-butadiene-styrene (SBS) copolymer. If desired, the SBS may be cross-linked. In this embodiment, the asphalt contains PPA in an amount between about 0.01% by weight and 3% by weight of the weight of the asphalt and SBS in an amount between about 0.01% by weight and 20% by weight of the weight of the asphalt. Preferably, PPA is added to achieve a concentration in the asphalt of between about 0.6% by weight and 2.25% by weight of the weight of the asphalt binder, and the SBS is added to achieve a concentration in the asphalt of between about 2.8% by weight and 4.25% by weight of the weight of the asphalt binder.

The RAP may be added to fresh mix pavement using typical hot mix or cold mix processes known to those skilled in the art.

To demonstrate the use of increased amounts of RAP containing PPA modified asphalt in fresh pavement mixes, a series of asphalt mixes were produced and tested. A neat asphalt binder having a PG grading of PG64-22 was used to produce three modified asphalts as set forth in Table 1 below.

TABLE 1

| Components | Asphalt 1<br>SBS<br>Modified | Asphalt 2<br>SBS/PPA<br>Modified | Asphalt 3<br>PPA<br>Modified |
|---|---|---|---|
| PG | 76-22 | 76-22 | 76-22 |
| % SBS (by weight of asphalt binder) | 4.25 | 2.8 | 0 |
| % PPA (by weight of asphalt binder) | 0 | 0.6 | 2.25 |
| % Sulfur (by weight of asphalt binder) | 0.1 | 0.1 | 0 |
| Original DSR @ 76° C. | 1.767 | 1.47 | 1.071 |
| RTFO DSR @ 76° C. | 2.312 | 2.719 | 2.625 |
| PAV DSR @ 31° C. | 1.436 | 1.477 | 2.31 |
| BBR S, @ −12° C. | 139 | 143 | 164 |
| BBR m, @ −12° C. | 0.35 | 0.35 | 0.326 |

The asphalt was used at the laboratory scale to produce RAP materials using each of the asphalt binder compositions. The laboratory scale RAP was produced according to protocol described by Kliewer, J. E., C. A. Bell, and D. A. Sosnovske, 1995, in "Investigation of the Relationship Between Field Performance and Laboratory Aging Properties of Asphalt Mixtures", Engineering Properties of Asphalt Mixtures and the Relationship to Their Performance, ASTM STP 1265, ASTM. The lab produced RAP was mixed with a fresh pavement composition containing a neat asphalt with a grading of PG64-22. Pavement compositions containing 15%, 30% and 45% RAP by weight were prepared for testing.

The pavement compositions containing the lab produced RAP were tested to determine the effect of the RAP on the physical properties of the pavement compositions. Beam fatigue tests were performed using three tensile strain levels at 400 and 650 microstrains. Each strain level had two samples for a total of six samples per pavement composition mix. All samples were long term oven aged for 5 days at 85° C. prior to cutting and trimming. A total of 72 samples were produced and tested.

Figure 1:
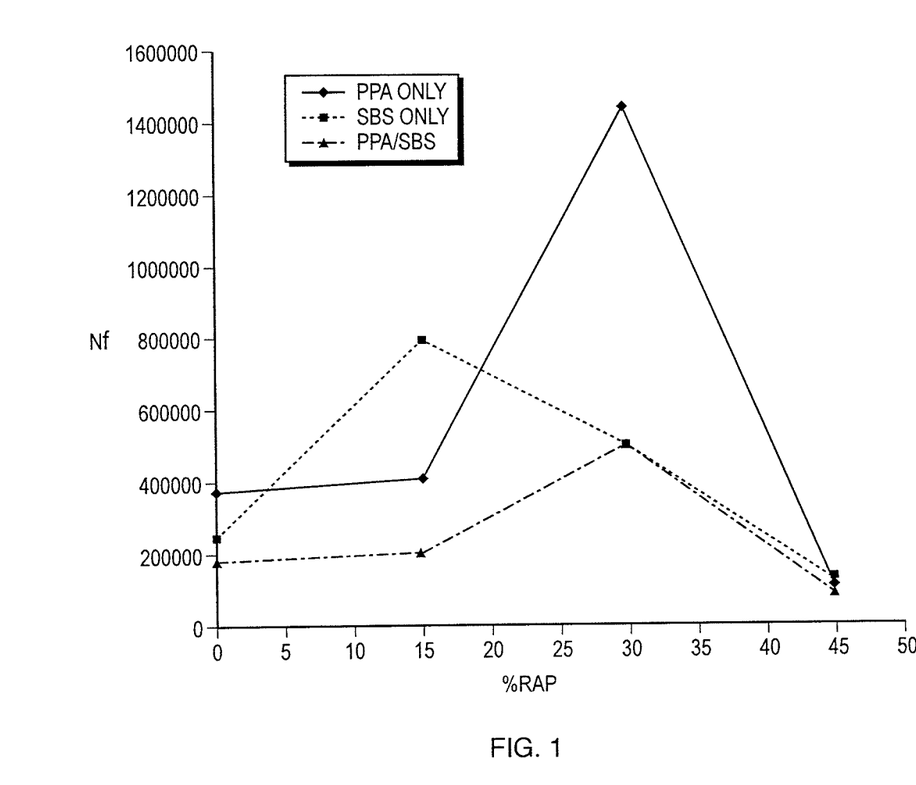
FIG. 1 is a graph showing the results of beam testing of pavement compositions containing RAP at 400 microstrain.

FIG. 1 shows the results of the beam fatigue testing at 400 microstrains. FIG. 1 shows the number of cycles until the loss of 50% of the initial stiffness as a function of RAP content. As shown in FIG. 1, the RAP containing only PPA results in the most improvement in fatigue resistance, with a maximum improvement at 30% RAP content.

Figure 2:
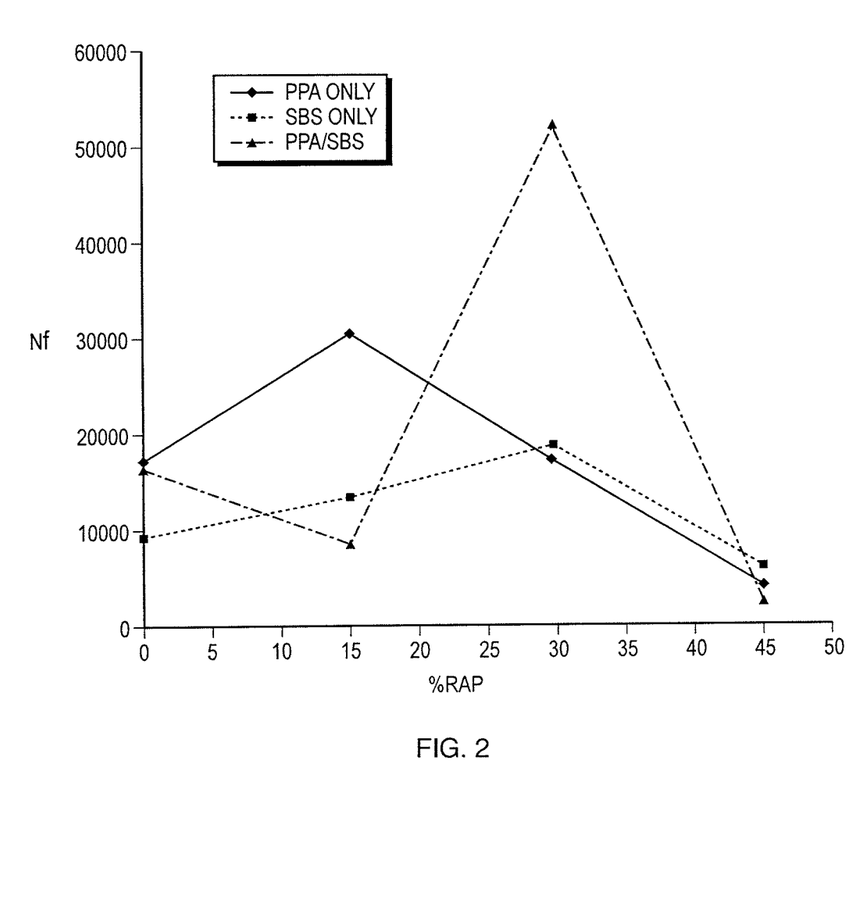
FIG. 2 is a graph showing the results of beam testing of pavement compositions containing RAP at 650 microstrain.
Figure 3:
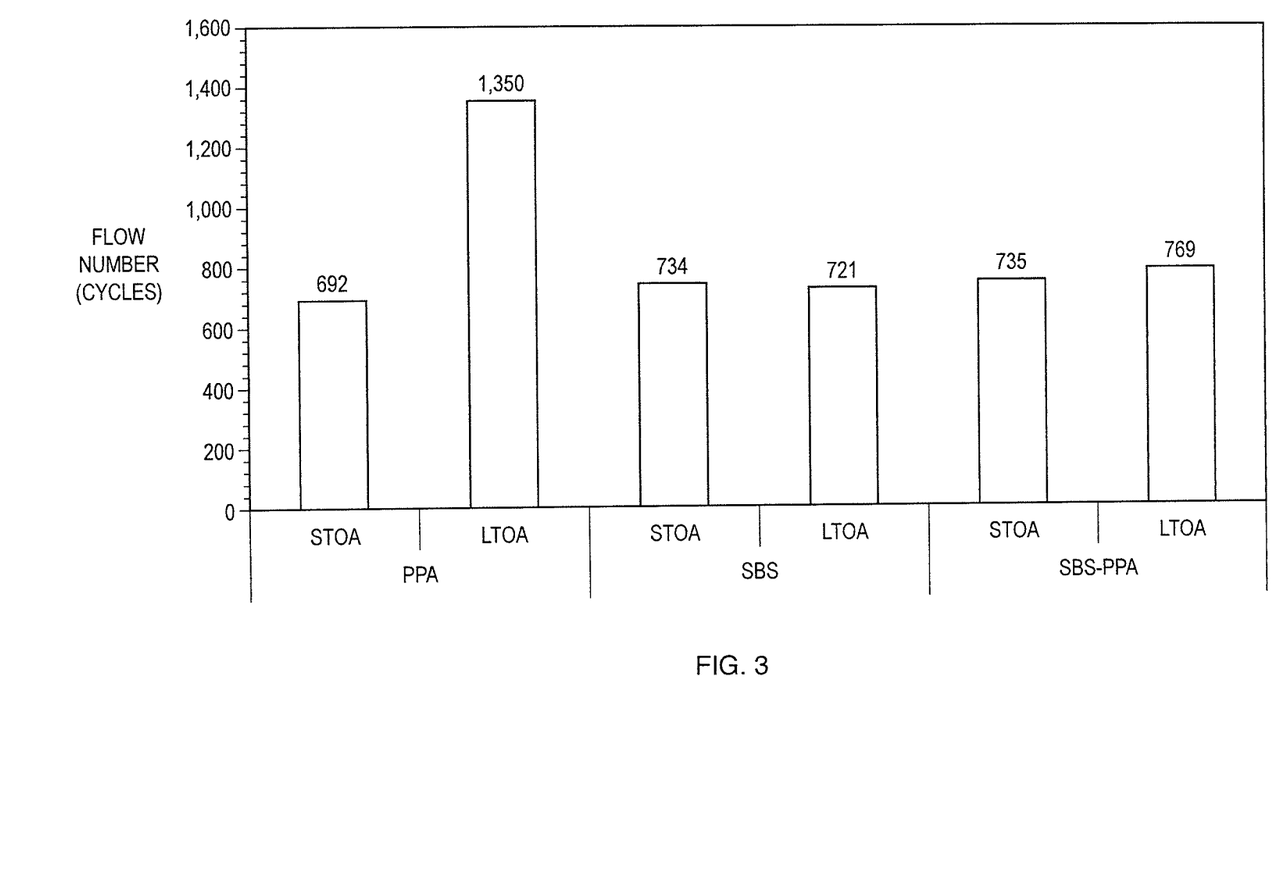
FIG. 3 is a bar chart showing the flow numbers for pavement compositions without RAP.
Figure 4:
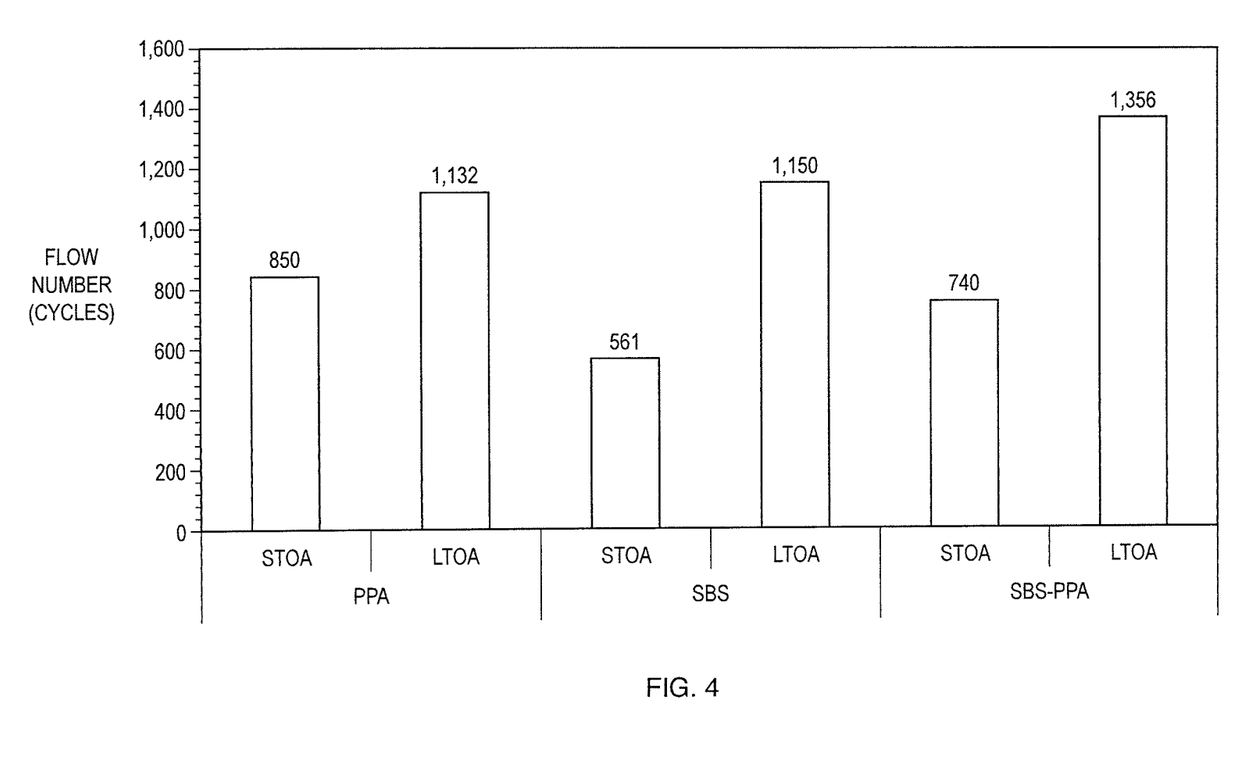
FIG. 4 is a bar chart showing the flow numbers for pavement compositions containing 15% by weight RAP.
Figure 5:
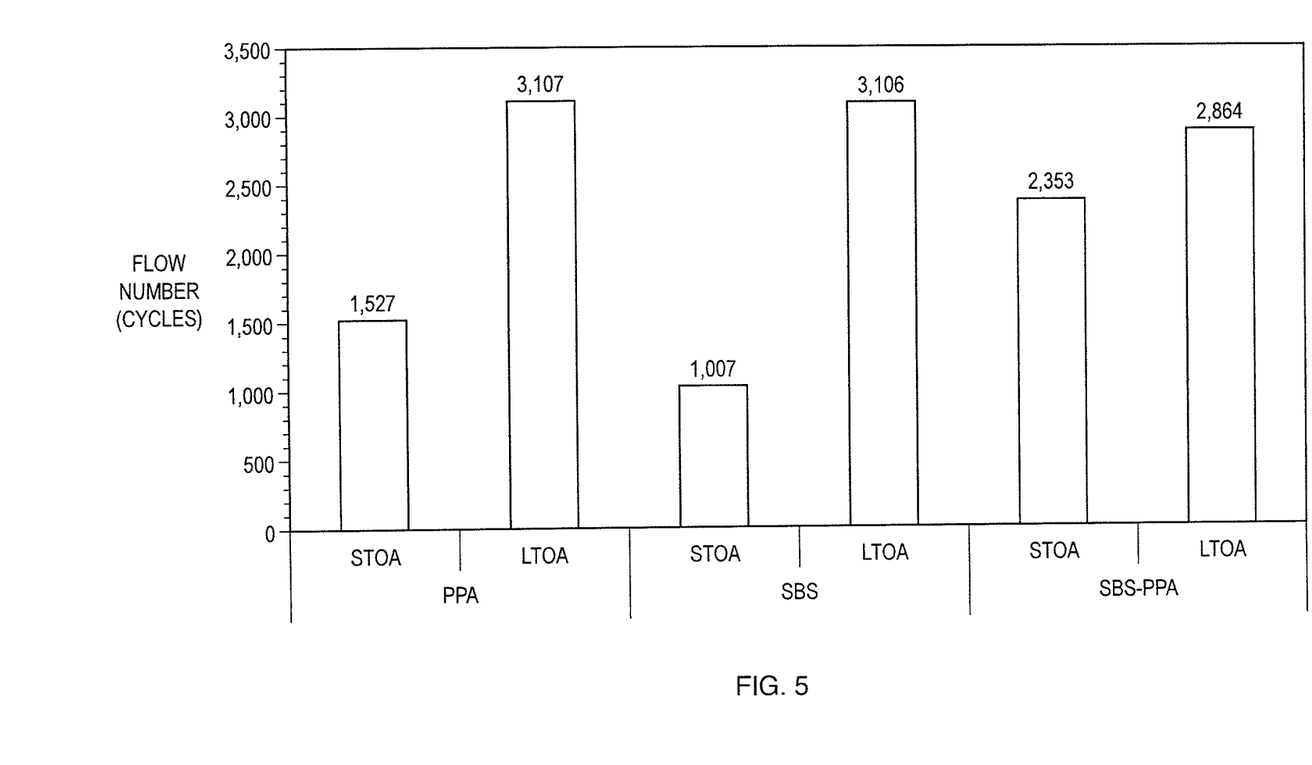
FIG. 5 is a bar chart showing the flow numbers for pavement compositions containing 30% by weight RAP.
Figure 6:
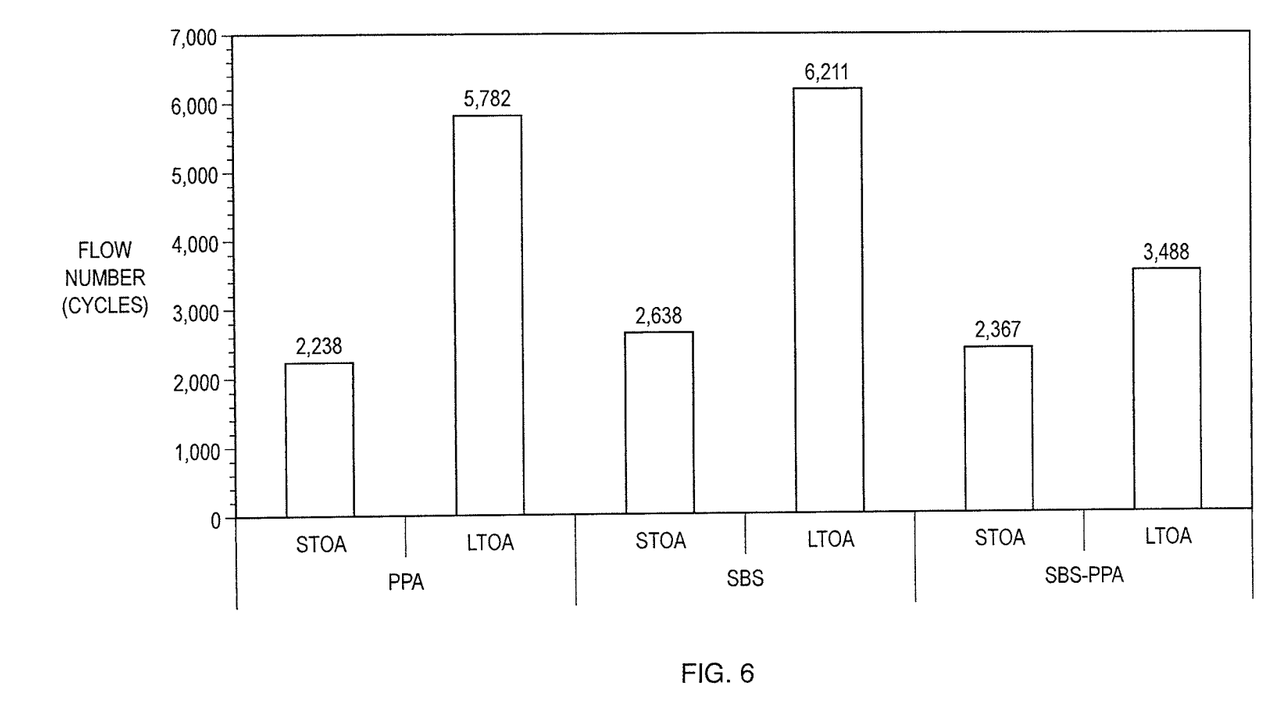
FIG. 6 is a bar chart showing the flow numbers for pavement compositions containing 45% by weight RAP.

FIG. 2 shows the results of the beam fatigue testing at 650 microstrains. In this test, the maximum fatigue resistance was observed using 30% by weight RAP containing both PPA and SBS polymer.

Repeated load testing was performed using the AMPT at a test temperature of 54° C. and cyclic stress of 600 kPa. The ASHTO R30 procedure was used for sample aging. Short term oven aging (STOA) was performed on loose mix for 4 hours @135° C. Long term oven aging (LTOA) was performed on compacted mix of 5 days at 85° C. FIGS. 3-6 show the flow numbers for virgin pavement compositions (no added RAP) and compositions containing 15%, 35% and 45% by weight RAP, respectively.

In general, the average flow numbers are approximately comparable for compositions following STOA. For the LTOA tests, the use of RAP containing PPA produced flow numbers that were higher than or approximately equal to the other compositions tested.

Figure 7:
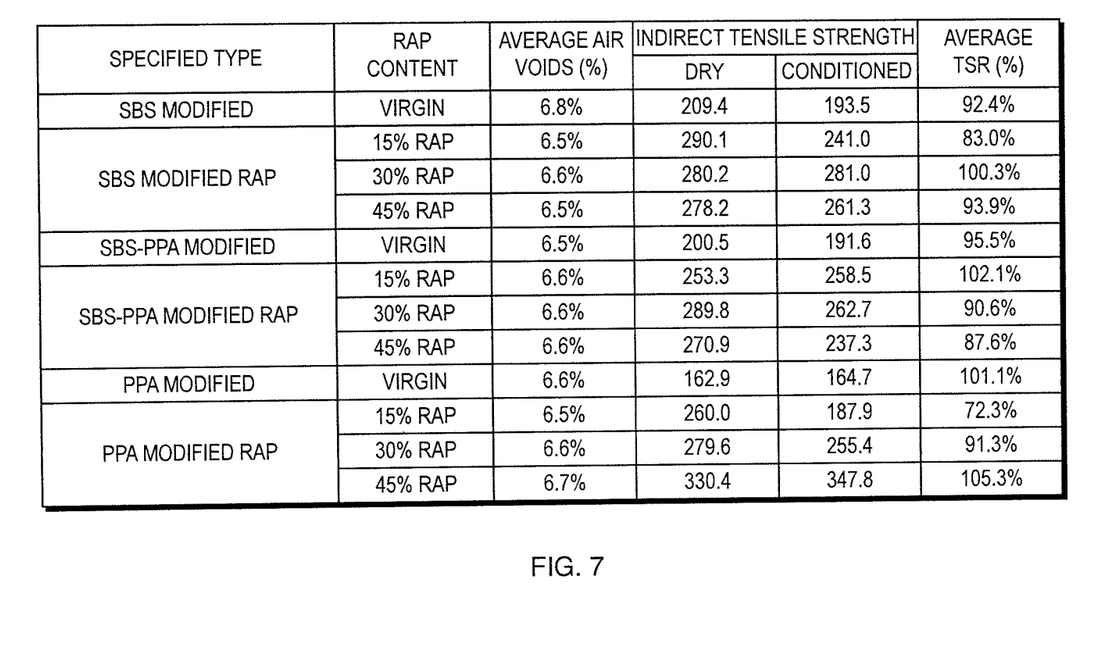
FIG. 7 is a table showing the results of tensile strength testing of pavement compositions containing RAP.

FIG. 7 shows the results of tensile strength testing and the tensile strength ratio for the various compositions tested.

In another embodiment of the invention, the RAP may be modified by adding PPA prior to mixing the RAP with the fresh pavement. In this embodiment, the RAP may contain PPA modified asphalt and additional PPA is added to enhance the properties of the RAP and the final pavement mix. Alternatively, the RAP may contain asphalt that had not been previously modified with PPA, and the PPA is added to modify the properties of the RAP and the final pavement mix. The RAP may be heated to a temperature of between 100° C. and 230° C., preferably about 180° C., and PPA may be added to the heated RAP to achieve a desired PPA concentration, typically between 0.1% to 3% by weight of the weight of the asphalt binder, and preferably between about 0.6% to 2.25% by weight of the asphalt binder.

In another embodiment of the invention, PPA may be added to the RAP and fresh pavement mixture. In this embodiment, the RAP and fresh pavement is mixed at a temperature of between 100° C. and 230° C., preferably about 180° C., and PPA may be added to achieve a desired PPA concentration, typically between 0.1% to 3% by weight of the weight of the asphalt binder, and preferably between about 0.6% to 2.25% by weight of the asphalt binder.

In another embodiment of the invention, PPA may be mixed with an oil, and the PPA and oil mixture may be added to the RAP prior to mixing with the fresh pavement. In this embodiment, sufficient PPA is added to the oil to achieve the desired PPA concentration in the RAP when the oil/PPA mix is added to the RAP. In one embodiment, the PPA concentration in the oil is between about 1% by weight and 99% by weight. The PPA/oil mixture may be added to the RAP to recover properties of the asphalt binder. Alternatively, the PPA/oil mixture may be added to the RAP/fresh pavement mixture to improve the properties of the pavement mixture.

In another embodiment of the invention, RAP is used in products that utilize asphalt binders. RAP may be used, for example, in products used in roofing applications or in roofing materials such as asphalt shingles or other materials used as roof coverings. In this embodiment of the invention, RAP is added to the asphalt material used in the manufacture of the roofing materials. The RAP is crushed and screened to obtain material having a desired particle size. The RAP is then added to the asphalt being prepared for the product and mixed. The asphalt and RAP are mixed under conditions typically used in the production of roofing materials.

The roofing materials may be roofing shingles comprised of an asphalt binder and other materials. Alternatively, the RAP may be used in sheet materials or in asphalt materials used to seal or cover roofs. In these applications, the quantity of RAP that is used in the asphalt portion of the roofing material is controlled to achieve the desired properties for the roofing material. Typically, the RAP may comprise up to about 70% of the asphalt portion of the roofing material.

As will be recognized by those of ordinary skill in the art based on the teachings herein, numerous changes and modifications may be made to the above-described invention without departing from its scope as defined in the appended claims. Accordingly, this detailed description of preferred embodiments is to be taken in an illustrative, as opposed to a limiting sense.

I claim:

1. A pavement composition comprising asphalt binder and aggregate, wherein at least 30% by weight of the pavement is reclaimed asphalt pavement wherein further, said asphalt binder contains polyphosphoric acid at a concentration between 2.0% by weight of the asphalt binder and 3% by weight of the asphalt binder.

2. The pavement composition of claim 1, further comprising at least one additional additive selected from the group consisting of acids, polymers, rubber, crumb rubber, anti-stripping agents, lime, gilsonite and fibers.

3. The pavement composition of claim 2, further comprising crumb rubber at a concentration between 0.01% by weight of the asphalt binder and 20% by weight of the asphalt binder.

4. The pavement composition of claim 1, further comprising styrene-butadiene-styrene copolymer at a concentration between 0.01% by weight of the asphalt binder and 20% by weight of the asphalt binder.

5. A method for producing a pavement composition comprising the steps of: (a) providing reclaimed asphalt pavement; (b) adding polyphosphoric acid to the reclaimed asphalt pavement; and (c) combining the polyphosphoric acid modified reclaimed asphalt pavement with fresh asphalt binder and aggregate to produce a pavement composition, wherein the pavement composition contains polyphosphoric acid at a concentration between 2.0% by weight of the asphalt binder and 3% by weight of the asphalt binder.

6. The method of claim 5, further comprising the step of heating the reclaimed asphalt pavement to a temperature of between 100° C. and 230° C. prior to adding the polyphosphoric acid.

7. The method of claim 6, further comprising the step of adding styrene-butadiene-styrene copolymer to achieve a concentration between 0.01% by weight of the asphalt and 20% by weight of the asphalt binder.

8. A method for producing a pavement composition comprising the steps of: (a) providing reclaimed asphalt pavement; (b) combining the reclaimed asphalt pavement with fresh asphalt and aggregate to produce a pavement composition; and (c) adding polyphosphoric acid to the pavement composition, wherein the pavement composition contains polyphosphoric acid at a concentration between 2.0% by weight of the asphalt binder and 3% by weight of the asphalt binder.

9. The method of claim 8, further comprising the step of heating the pavement composition to a temperature of between 100° C. and 230° C. prior to adding the polyphosphoric acid.

10. The method of claim 9, further comprising the step of adding styrene-butadiene-styrene copolymer to achieve a concentration between 0.01% by weight of the asphalt and 20% by weight of the asphalt.

* * * * *